United States Patent [19]

Betensky

[11] Patent Number: 4,707,084

[45] Date of Patent: Nov. 17, 1987

[54] PROJECTION LENS

[75] Inventor: Ellis I. Betensky, Redding, Conn.

[73] Assignee: U.S. Precision Lens, Inc., Cincinnati, Ohio

[21] Appl. No.: 652,062

[22] Filed: Sep. 19, 1984

Related U.S. Application Data

[63] Continuation-in-part of Ser. No. 642,825, Aug. 21, 1984, Pat. No. 4,697,892, which is a continuation-in-part of Ser. No. 543,017, Oct. 18, 1983, abandoned.

[51] Int. Cl.$^4$ .................... G02B 13/18; G02B 9/34
[52] U.S. Cl. ..................... 350/432; 350/412; 350/469; 350/473
[58] Field of Search ............... 350/432, 412, 469, 473

[56] References Cited

U.S. PATENT DOCUMENTS

| | | | |
|---|---|---|---|
| 2,440,088 | 4/1948 | Grey | 350/453 |
| 2,468,564 | 4/1949 | Luneburg | 350/432 |
| 2,479,907 | 8/1949 | Cox | 350/432 |
| 2,502,543 | 4/1950 | Warmisham | 350/432 |
| 2,552,672 | 5/1951 | Grey | 350/432 |
| 2,638,034 | 5/1953 | Wreathall | 350/432 |
| 2,660,094 | 11/1953 | Wreathall | 350/432 |
| 2,737,849 | 3/1956 | Tiller | 350/464 |
| 3,429,997 | 2/1969 | Rosner et al. | 350/438 |
| 3,800,085 | 3/1974 | Ambats et al. | 350/420 |
| 3,868,173 | 2/1975 | Miles et al. | 350/432 |
| 3,951,523 | 4/1976 | Nishimoto | 350/432 |
| 3,998,527 | 12/1976 | Ikeda et al. | 350/432 |
| 4,300,817 | 11/1981 | Betensky | 350/412 |
| 4,348,081 | 9/1982 | Betensky | 350/412 |
| 4,530,575 | 7/1985 | Yamakawa | 350/412 X |
| 4,577,935 | 3/1986 | Yamakawa et al. | 350/412 X |
| 4,620,773 | 11/1986 | Fukuda | 350/412 X |

FOREIGN PATENT DOCUMENTS

| | | |
|---|---|---|
| 593514 | 10/1947 | United Kingdom . |
| 1269133 | 4/1972 | United Kingdom . |

Primary Examiner—Bruce Y. Arnold
Assistant Examiner—Scott J. Sugarman
Attorney, Agent, or Firm—Costas, Montgomery & Dorman

[57] ABSTRACT

A projection lens for a cathode ray tube display which comprises from the image end a first lens unit of relatively weak optical power serving primarily to correct aperture dependent aberrations, a second lens unit of strong positive power permitting decreased equivalent focal length and resulting wide field angle, and a third lens unit having a strongly concave image side surface and serving to correct the Petzval curvature of the surfaces of the other lens units. The second lens unit comprises two elements of overall biconvex shape separated by an air gap. The facing surfaces of the two elements of the second lens unit are of relatively weak optical power and at least one of the surfaces of the two elements of the second lens unit is aspheric to contribute to the corrections provided by said second lens unit.

43 Claims, 1 Drawing Figure

PROJECTION LENS

RELATED APPLICATIONS

This application is a continuation-in-part of application Ser. No. 642,825, filed Aug. 21, 1984, now U.S. Pat. No. 4,697,892, which is a continuation-in-part of application Ser. No. 543,017, filed Oct. 18, 1983, now abandoned.

FIELD OF THE INVENTION

This invention relates to projection lenses, and more particularly, relates to projection lenses for wide screen television systems.

BACKGROUND OF THE INVENTION

A preferred form of projection lenses for wide screen television is disclosed in U.S. Pat. Nos. 4,348,081 and 4,300,817, as well as copending U.S. application Ser. No. 280,785, now U.S. Pat. No. 4,526,442, assigned to the assignee of the present application. The lenses disclosed in the aforementioned patents and application generally comprise three lens units: from the image end a first lens unit of relatively small optical power; a second lens unit which supplies substantially all the positive power of the lens; and a third negative lens unit having a strong concave surface towards the image end of the lens, serving as a field flattener, and essentially correcting the Petzval curvature of the first and second lens units. The lenses, as disclosed, are designed for use with a cathode ray tube.

The lenses of U.S. Pat. No. 4,300,817, disclosing a single biconvex element in the second lens unit, all have an equivalent focal length (EFL) of about one hundred fourteen millimeters or greater, while the lenses of U.S. Pat. No. 4,348,081, which utilize a two-element lens unit including a biconvex element, may have a reduced EFL. The lenses described in U.S. Pat. No. 4,526,442 are designed to have a fold in the optical axis between the first and second lens units and have been designed so that the EFL is as low as one hundred fourteen millimeters. These EFL's are for cathode ray tube screens having a display surface with an approximate five inch diagonal.

Projection TV sets are rather bulky and require high volume cabinets. One manner of reducing the cabinet size is to decrease the EFL of the projection lenses, thus increasing the angular coverage of the lens.

A further consideration is introduced wherein a spacing is provided between the screen of the CRT and the third lens unit of the projection lens. This spacing may be required for the inclusion of a liquid cooling material and a window necessary to enclose the coolant against the face of the CRT. This additional spacing between the face of the CRT causes the third negative element to contribute more negative power, which must be compensated by increased power in the positive second lens unit. An effect of increasing the angular coverage of the lens as a result of decreasing the EFL, is that the aberrations become more difficult to correct. A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, the EFL may be shortened. However, merely splitting the optical power of the second lens unit into two elements to obtain additional degrees of design freedom, does not provide acceptable contrast and resolution where the angular coverage of the projection lenses is required to be in excess of twenty-seven degrees semi-field.

Improvements in projection television systems require both reduced cost and smaller volume of the cabinet for rear screen projection systems. Both of these advantages can be realized if the EFL of the lens is short enough to provide angular coverage of at least sixty degrees. In such systems, a very small package can be achieved utilizing only one mirror. Also, by designing a lens of decreased focal length, for example, less than eighty-five millimeters for a five inch diagonal CRT, the lens element diameters are reduced, further decreasing manufacturing costs. The projection lenses as exemplified by the above-identified patents had considerably less angular coverage, typically being less than fifty degrees, and the field flattening element would have considerably less power. This means that in a projection lens of wider field angle more aberrations may be introduced by the field flattener, which must be corrected elsewhere. Furthermore, the angle of off-axis rays passing through the second lens lens unit is also increased, so that those aberrations are likewise increased.

The present design eliminates these problems by a new configuration of the second positive lens unit.

SUMMARY OF THE INVENTION

Briefly stated, the invention comprises a projection lens having from the image end an element of small optical power serving to primarily correct aperture dependent aberrations, a second lens unit providing substantially all the positive power of the overall lens, comprising two positive elements which define an air space therebetween, and a third lens unit which serves primarily as a field flattener to correct the Petzval curvature of the other elements. The third lens unit has a very strongly concave surface to the image. The second lens unit is overall convex and the facing surfaces have very little curvature with at least one of the facing surfaces being aspheric. The relationship of the powers of the elements of the second lens unit are so selected as to contribute to the achievement of the necessary aberration correction and decrease in focal length.

An object of this invention is to provide a new and improved projection lens specifically designed for rear projection television systems.

Another object of this invention is to provide a projection television lens of the type described having a new and improved construction of the second lens unit which permits a wider field angle together with corrections of the aberrations usually attendant with an increase in field angle.

The features of the invention which are believed to be novel are particularly pointed out and distinctly claimed in the concluding portion of this specification. The invention, however, both as to operation and organization, together with further objects and advantages thereof, may best be appreciated by reference to the drawings and the following detailed detailed description taken in conjunction with the drawings.

BRIEF DESCRIPTION OF THE DRAWINGS

The single FIGURE of the drawings is a schematic side elevation representative of lenses embodying the invention.

DETAILED DESCRIPTION OF PREFERRED EMBODIMENTS OF THE INVENTION

Figure 1:
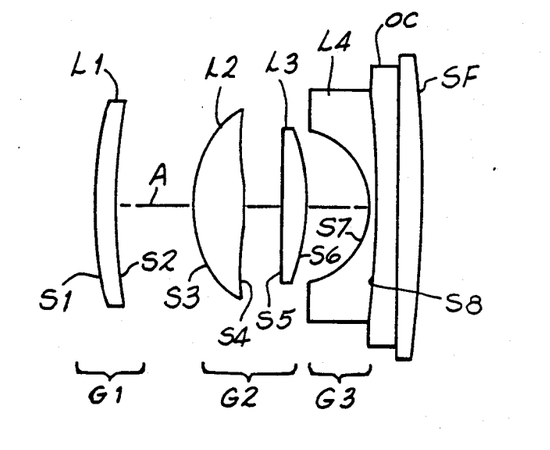

Lenses embodying the invention in all cases comprise three lens units. The first lens unit G1 is of relatively weak optical power and serves primarily to correct aperture dependent aberrations. The second lens unit G2 is comprised of the elements L2 and L3, and lens unit G2 is overall biconvex and provides essentially all the positive power of the overall lens. A third lens unit G3 comprises the element L4 which has a concave image side surface and serves as a field flattener, essentially correcting the Petzval curvature of the elements of the first and second lens units. The first lens unit G1 of small optical power may be of positive optical power as shown in Tables I-V, or of negative optical power as shown in Tables VI-VIII.

In the single FIGURE of the drawings, the element L4 is shown optionally coupled to the surface of the screen SF of a CRT by a coupling OC. The optical couplinG OC is a liquid having an index of refraction of 1.460 to 1.461 and a thickness of about eight to twelve millimeters.

In large screen television projection systems, three CRT's are used, the CRT's being red, blue, and green, and the system is aligned so that the CRT's are superimposed in focus to provide a full color image. The lenses hereinafter described are designed for CRT's primarily having an image diagonal of either four and a half or five inches.

The compactness of the lens design with a wider field angle is due primarily to the construction of lens unit G2 comprising elements L2 and L3 which are necessary to obtain the desired performance. Specifically, the power $K_2$ of element $L_2$ should bear a ratio to the power $K_3$ of the element $L_3$ as follows:

$$2.0 > K_2/K_3 > 1.0$$

The ratio, as exemplified by $K_2/K_3$ is the reciprocal of the EFL of each of the elements $L_2$ and $L_3$ in millimeters.

Additionally, the radii of curvature of the facing surfaces of the elements of the second lens unit at the optical axis is at least two times the equivalent focal length of the lens.

Moreover, the overall shape of the second lens unit G2 should be biconvex and the air spaced facing surfaces should have at least one aspheric surface to provide the required correction, as will be further pointed out in the prescriptions for the disclosed lenses.

In the disclosed lenses, the first lens unit G2, as defined from the image side, is of relatively weak optical power and serves to primarily correct aperture dependent aberrations. The second lens unit G2 provides essentially all of the positive power of the overall lens, and the configuration thereof ends itself to the provision of a lens of relatively wide field angle, while correcting aberrations that might be introduced by the third lens unit in such a wide field angle lens.

The third lens unit G3 is distinguished by a strongly concave image side surface; and the third lens unit serves primarily as a field flattener which essentially corrects the Petzval curvature of the elements of the first and second lens units.

Lenses embodying the invention comprise only three lens units, and, as disclosed, four elements, to provide the necessary aberration correction and compactness of the lens through the use of aspheric surfaces on at least one surface in each of the first, second and third lens units. These aspheric surfaces are defined by the equation $$X = \frac{Cy^2}{1 + \sqrt{1 - (1 + K)C^2 y^2}} + Dy^4 + Ey^6 + Fy^8 + Gy^{10}$$

where X is the surface sag at a semi-aperture distance Y from the axis A of the lens; C is the curvature of the lens surface at the optical axis A, equal to the reciprocal of the radius at the optical axis; and K is a conic constant of a surface of revolution.

In the Tables defining the disclosed lenses, positive surface radii are struck from the right on the optical axis, and negative radii are struck from the left on the optical axis of the lens. The lens prescriptions, as given, are for a CRT having a five inch diagonal.

The aspheric surfaces are utilized for correction purposes and therefore maintain the lens as a three lens unit lens.

In the following Tables, the lens elements are identified by the reference L followed by an arabic numeral from the image to the object end. The surfaces are defined by the reference S followed by an arabic numeral from the image to the object end, the axial distances as between surfaces are given. The index of a fraction of each lens element is denoted by $N_d$ and the dispersion of the lens as measured by its Abbe number is given under the designation $V_d$.

TABLE I

| LENS | SURFACE RADIUS (mm) | AXIAL DISTANCE BETWEEN SURFACES (mm) | $N_d$ | $V_d$ |
|---|---|---|---|---|
| L1 | S1 115.050 | | | |
| | | 8.949 | 1.491 | 57.2 |
| | S2 183.743 | | | |
| | | 31.946 | | |
| | S3 45.820 | | | |
| L2 | | 21.028 | 1.491 | 57.2 |
| | S4 −525.725 | | | |
| | | 13.865 | | |
| | S5 441.896 | | | |
| L3 | | 10.922 | 1.491 | 57.2 |
| | S6 −81.690 | | | |
| | | 22.318 | | |
| | S7 −30.780 | | | |
| L4 | | 2.000 | 1.491 | 57.2 |
| | S8 Plano | | | |

Aspheric Surfaces: S1, S4, S5, S7

| | S1 | S4 | S5 | S8 |
|---|---|---|---|---|
| D | −0.614 × 10⁻⁰⁶ | 0.100 × 10⁻⁰⁵ | −0.275 × 10⁻⁰⁶ | −0.257 × 10⁻⁰⁵ |
| E | 0.154 × 10⁻⁰⁹ | 0.929 × 10⁻⁰⁹ | −0.146 × 10⁻⁰⁹ | 0.785 × 10⁻⁰⁸ |
| F | −0.118 × 10⁻¹² | −0.553 × 10⁻¹² | −0.814 × 10⁻¹³ | −0.149 × 10⁻¹⁰ |
| G | 0.264 × 10⁻¹⁶ | 0.255 × 10⁻¹⁵ | 0.655 × 10⁻¹⁶ | 0.112 × 10⁻¹³ |
| K | — | 0.010 | 0.010 | 0.010 |

EFL = 73.24 mm
Relative Aperture = 1/1.12

TABLE II

| LENS | SURFACE RADII (mm) | AXIAL DISTANCE BETWEEN SURFACES (mm) | $N_d$ | $V_d$ |
|---|---|---|---|---|
| L1 | S1 698.318 | | | |
| | | 5.978 | 1.491 | 57.2 |
| | S2 823.548 | | | |
| | | 34.213 | | |

TABLE II-continued

| LENS | SURFACE RADII (mm) | AXIAL DISTANCE BETWEEN SURFACES (mm) | $N_d$ | $V_d$ |
|---|---|---|---|---|
| L2 | S3 51.553 | 25.758 | 1.491 | 57.2 |
|  | S4 −512.740 | 13.040 |  |  |
| L3 | S5 311.806 | 13.610 | 1.491 | 57.2 |
|  | S6 −98.754 | 33.576 |  |  |
| L4 | S7 −31.518 | 2.000 | 1.491 | 57.2 |
|  | S8 Plano |  |  |  |

Aspheric Surfaces: S1, S4, S5, S6, S7

|  | S1 | S4 | S5 | S6 | S7 |
|---|---|---|---|---|---|
| D | $-0.576 \times 10^{-06}$ | $0.116 \times 10^{-05}$ | $0.709 \times 10^{-07}$ | — | $-0.479 \times 10^{-05}$ |
| E | $0.194 \times 10^{-09}$ | $0.457 \times 10^{-09}$ | $0.154 \times 10^{-09}$ | — | $0.102 \times 10^{-09}$ |
| F | $-0.960 \times 10^{-13}$ | $-0.112 \times 10^{-12}$ | $-0.414 \times 10^{-12}$ | — | $-0.737 \times 10^{-09}$ |
| G | $0.178 \times 10^{-16}$ | $0.132 \times 10^{-16}$ | $0.903 \times 10^{-16}$ | — | $-0.517 \times 10^{-15}$ |
| K | 0.010 | 0.010 | 0.010 | −1.000 | −1.000 |

EFL = 77.83 mm
Relative Aperture = 1/1.13

TABLE III

| LENS | SURFACE RADII (mm) | AXIAL DISTANCE BETWEEN SURFACES (mm) | $N_d$ | $V_d$ |
|---|---|---|---|---|
| L1 | S1 117.348 | 8.949 | 1.491 | 57.2 |
|  | S2 222.782 | 41.170 |  |  |
| L2 | S3 39.868 | 18.411 | 1.491 | 57.2 |
|  | S4 −6694.091 | 15.673 |  |  |
| L3 | S5 260.930 | 6.679 | 1.658 | 50.9 |
|  | S6 −106.871 | 18.466 |  |  |
| L4 | S7 −27.668 | 2.000 | 1.491 | 57.2 |
|  | S8 Plano |  |  |  |

Aspheric Surfaces: S1, S4, S7

|  | S1 | S4 | S7 |
|---|---|---|---|
| D | $-0.669 \times 10^{-06}$ | $0.149 \times 10^{-05}$ | $-0.644 \times 10^{-05}$ |
| E | $0.224 \times 10^{-09}$ | $0.145 \times 10^{-08}$ | $0.279 \times 10^{-07}$ |
| F | $-0.122 \times 10^{-12}$ | $-0.103 \times 10^{-11}$ | $-0.591 \times 10^{-10}$ |
| G | $0.221 \times 10^{-16}$ | $0.635 \times 10^{-15}$ | $0.509 \times 10^{-13}$ |
| K | 0.010 | 0.010 | 0.010 |

EFL = 67.85 mm
Relative Aperture = 1/1.12

TABLE IV

| LENS | SURFACE RADII (mm) | AXIAL DISTANCE BETWEEN SURFACES (mm) | $N_d$ | $V_d$ |
|---|---|---|---|---|
| L1 | S1 95.282 | 11.210 | 1.491 | 57.2 |
|  | S2 149.554 | 46.218 |  |  |
| L2 | S3 53.438 | 24.381 | 1.491 | 57.2 |
|  | S4 559.853 | 19.172 |  |  |
| L3 | S5 339.239 | 9.087 | 1.658 | 50.9 |
|  | S6 −124.636 | 29.819 |  |  |
| L4 | S7 −38.499 | 2.000 | 1.491 | 57.2 |
|  | S8 Plano |  |  |  |

Aspheric Surfaces: S1, S4, S7

|  | S1 | S4 | S7 |
|---|---|---|---|
| D | $-0.190 \times 10^{-16}$ | $0.986 \times 10^{-06}$ | $-0.219 \times 10^{-05}$ |
| E | $0.197 \times 10^{-10}$ | $0.414 \times 10^{-09}$ | $0.554 \times 10^{-08}$ |
| F | $-0.232 \times 10^{-13}$ | $-0.206 \times 10^{-12}$ | $-0.563 \times 10^{-11}$ |
| G | $0.381 \times 10^{-17}$ | $0.929 \times 10^{-16}$ | $0.221 \times 10^{-14}$ |
| K | 0.010 | 0.010 | 0.010 |

EFL = 84.99 mm
Relative Aperture = 1/1.10

TABLE V

| LENS | SURFACE RADII (mm) | AXIAL DISTANCE BETWEEN SURFACES (mm) | $N_d$ | $V_d$ |
|---|---|---|---|---|
| L1 | S1 129.775 | 8.949 | 1.491 | 57.2 |
|  | S2 250.970 | 31.809 |  |  |
| L2 | S3 53.002 | 20.260 | 1.491 | 57.2 |
|  | S4 −230.155 | 16.007 |  |  |
| L3 | S5 2920.596 | 9.771 | 1.491 | 57.2 |
|  | S6 −80.811 | 26.206 |  |  |
| L4 | S7 −33.389 | 2.00 | 1.491 | 57.2 |
|  | S8 −600.000 |  |  |  |

Aspheric Surfaces: S1, S4, S6, S7

|  | S1 | S4 | S6 | S7 |
|---|---|---|---|---|
| D | $-0.655 \times 10^{-06}$ | $0.793 \times 10^{-06}$ | $0.388 \times 10^{-06}$ | $-0.160 \times 10^{-05}$ |
| E | $0.937 \times 10^{-10}$ | $0.406 \times 10^{-09}$ | $0.263 \times 10^{-09}$ | $-0.842 \times 10^{-09}$ |
| F | $-0.733 \times 10^{-13}$ | $-0.204 \times 10^{-12}$ | $-0.613 \times 10^{-12}$ | $0.271 \times 10^{-11}$ |
| G | $0.160 \times 10^{-16}$ | $0.984 \times 10^{-16}$ | $0.264 \times 10^{-15}$ | $-0.133 \times 10^{-14}$ |
| K | 0.010 | 0.010 | 0.010 | 0.010 |

EFL = 73.25 mm
Relative Aperture = 1/1.12

TABLE VI

| LENS | SURFACE RADII (mm) | AXIAL DISTANCE BETWEEN SURFACES (mm) | $N_d$ | $V_d$ |
|---|---|---|---|---|
| L1 | S1 864.113 | 6.243 | 1.491 | 57.2 |
|  | S2 172.923 | 37.868 |  |  |
| L2 | S3 56.297 | 26.966 | 1.491 | 57.2 |
|  | S4 −400.050 | 11.382 |  |  |
| L3 | S5 187.805 | 16.248 | 1.491 | 57.2 |
|  | S6 −107.571 | 45.408 |  |  |
| L4 | S7 −42.673 | 2.000 | 1.491 | 57.2 |
|  | S8 Plano |  |  |  |

Aspheric Surfaces: S2, S3, S4, S6, S7

|  | S2 | S3 | S4 |
|---|---|---|---|
| D | $0.480 \times 10^{-06}$ | $0.894 \times 10^{-07}$ | $0.314 \times 10^{-06}$ |
| E | $-0.163 \times 10^{-09}$ | $0.705 \times 10^{-11}$ | $0.871 \times 10^{-10}$ |
| F | $0.139 \times 10^{-12}$ | $0.857 \times 10^{-14}$ | $-0.136 \times 10^{-12}$ |

TABLE VI-continued

| | | | |
|---|---|---|---|
| G | $-0.207 \times 10^{-16}$ | $-0.318 \times 10^{-16}$ | $0.113 \times 10^{-16}$ |
| K | 0.010 | $-1.000$ | 0.010 |

| | S6 | S7 |
|---|---|---|
| D | $0.159 \times 10^{-06}$ | $-0.687 \times 10^{-05}$ |
| E | $0.277 \times 10^{-09}$ | $0.395 \times 10^{-08}$ |
| F | $-0.711 \times 10^{-13}$ | $-0.406 \times 10^{-11}$ |
| G | $-0.990 \times 10^{-17}$ | $0.638 \times 10^{-15}$ |
| K | | $-1.000$ |

EFL = 77.744
Aperture = 1/1.13

TABLE VII

| LENS | SURFACE RADII (mm) | AXIAL DISTANCE BETWEEN SURFACES (mm) | $N_d$ | $V_d$ |
|---|---|---|---|---|
| L1 | S1 185.971 | | | |
| | | 8.949 | 1.491 | 57.2 |
| | S2 115.960 | | | |
| | | 28.666 | | |
| L2 | S3 53.594 | | | |
| | | 21.610 | 1.491 | 57.2 |
| | S4 $-198.472$ | | | |
| | | 18.107 | | |
| L3 | S5 180.049 | | | |
| | | 14.058 | 1.491 | 57.2 |
| | S6 $-89.499$ | | | |
| | | 30.417 | | |
| L4 | S7 $-38.732$ | | | |
| | | 2.000 | 1.491 | 57.2 |
| | S8 Plano | | | |

Aspheric Surfaces: S2, S3, S5, S7

| | S2 | S3 | S5 | S7 |
|---|---|---|---|---|
| D | $0.486 \times 10^{-16}$ | $-0.130 \times 10^{-06}$ | $-0.321 \times 10^{-07}$ | $-0.564 \times 10^{-05}$ |
| E | $-0.581 \times 10^{-11}$ | $-0.155 \times 10^{-09}$ | $-0.268 \times 10^{-09}$ | $0.245 \times 10^{-08}$ |
| F | $0.765 \times 10^{-13}$ | $-0.363 \times 10^{-13}$ | $0.407 \times 10^{-12}$ | $-0.370 \times 10^{-11}$ |
| G | $-0.809 \times 10^{-18}$ | $-0.113 \times 10^{-16}$ | $-0.123 \times 10^{-15}$ | $0.455 \times 10^{-15}$ |
| K | | $-1.000$ | 0.010 | 0.010 |

EFL = 72.881
Relative Aperture = 1/1.12

TABLE VIII

| LENS | SURFACE RADII (mm) | AXIAL DISTANCE BETWEEN SURFACES (mm) | $N_d$ | $V_d$ |
|---|---|---|---|---|
| L1 | S1 $-1125.147$ | | | |
| | | 6.243 | 1.491 | 57.2 |
| | S2 241.451 | | | |
| | | 28.374 | | |
| L2 | S3 57.144 | | | |
| | | 22.655 | 1.491 | 57.2 |
| | S4 $-738.941$ | | | |
| | | 14.932 | | |
| L3 | S5 358.660 | | | |
| | | 18.726 | 1.613 | 58.6 |
| | S6 $-90.673$ | | | |
| | | 46.540 | | |
| L4 | S7 $-42.831$ | | | |
| | | 2.000 | 1.491 | 57.2 |
| | S8 Plano | | | |

Aspheric Surfaces: S2, S3, S4, S7

| | S2 | S3 | S4 | S7 |
|---|---|---|---|---|
| D | $0.361 \times 10^{-01}$ | $0.260 \times 10^{-06}$ | $0.894 \times 10^{-06}$ | $-0.708 \times 10^{-05}$ |
| E | $-0.996 \times 10^{-10}$ | $0.462 \times 10^{-10}$ | $0.332 \times 10^{-09}$ | $0.552 \times 10^{-08}$ |
| F | $0.612 \times 10^{-10}$ | $0.128 \times$ | $0.458 \times$ | $-0.552 \times$ |

TABLE VIII-continued

| | | | | |
|---|---|---|---|---|
| | $10^{-10}$ | $10^{-12}$ | $10^{-13}$ | $10^{-11}$ |
| G | $-0.598 \times 10^{-17}$ | $-0.685 \times 10^{-16}$ | $-0.542 \times 10^{-16}$ | $0.136 \times 10^{-14}$ |
| K | 0.010 | $-1.000$ | 0.010 | $-1.000$ |

EFL = 77.905
Relative Aperture = 1/1.13

The relative powers $K_{G1}$, $K_{G2}$, and $K_{G3}$ of lens units G1, G2, and G3, respectively, are shown in ratios to the overall power $K_o$ of the lens in Table IX:

TABLE IX

| TABLE | $K_{G1}/K_o$ | $K_{G2}/K_o$ | $K_{G3}/K_o$ | $K_o$ |
|---|---|---|---|---|
| I | .124 | 1.164 | $-1.168$ | .0137 |
| II | .00851 | 1.125 | $-1.219$ | .0128 |
| III | .0136 | 1.210 | $-1.211$ | .0147 |
| IV | .170 | 1.121 | $-1.089$ | .0118 |
| V | .139 | 1.102 | $-1.015$ | .0137 |
| VI | $-.177$ | 1.126 | $-0.899$ | .0129 |
| VII | $-.112$ | 1.169 | $-0.929$ | .0137 |
| VIII | $-.194$ | 1.139 | $-0.897$ | .0128 |

The range of powers $K_{G1}$, $K_{G2}$, and $K_{G3}$ of $K_{G3}$ lens units G1, G2, and G3 as ratios to the overall power $K_o$ of the disclosed lenses are given in Table X:

TABLE X

| $-.20$ | $<$ | $K_{G1}/K_o$ | $<$ | .20 |
|---|---|---|---|---|
| 1.3 | $>$ | $K_{G2}/K_o$ | $>$ | 1.0 |
| 1.3 | $>$ | $|K_{G3}/K_o|$ | $>$ | 1.0 |

The relation of the optical powers $K_2$ of the first element $L_2$ of lens unit G2 to the optical power $K_3$ of the second element $L_3$ of unit G2 is $$2.0 > K_2/K_3 > 1.0$$

as shown by Table XI:

TABLE XI

| TABLE | $K_2/K_3$ |
|---|---|
| I | 1.634 |
| II | 1.594 |
| III | 1.425 |
| IV | 1.179 |
| V | 1.778 |
| VI | 1.384 |
| VII | 1.393 |
| XII | 1.103 |

Table XII sets forth the relationship of the axial spacing between the first and second lens units to the equivalent focal length of each of the lenses of Tables I–VIII.

TABLE XII

| TABLE | $D_{12}$ | EFL | $D_{12}/EFL$ |
|---|---|---|---|
| I | 31.95 | 73.24 | .436 |
| II | 34.21 | 77.83 | .440 |
| III | 41.17 | 67.85 | .607 |
| IV | 46.22 | 85.00 | .543 |
| V | 31.81 | 73.25 | .434 |
| VI | 37.87 | 77.74 | .487 |
| VII | 28.67 | 72.88 | .393 |
| VIII | 28.37 | 77.91 | .364 |

The absolute value of the ratio of the radius of any surfaces S4 or S5 to the EFL of the lens in all examples is greater than two. The surfaces S5 and S6 contribute very little optical power to the lens, but provide necessary aberration corrections by the provision of at least one aspheric surface and the air space therebetween. In all examples, surface S4 is aspheric and the lenses of Tables I and II have aspheric surfaces S5. The positive optical power of lens unit G2, which is substantially all of the optical power of each lens, is provided by the overall biconvex shape.

While at least one of the facing surfaces S4 and S5 are shown as aspheric, lenses embodying the invention can be constructed with only one of the surfaces S3 and/or S6 aspheric with surfaces S4 and S5 spheric. In the example of Table VIII, element L4 is totally spheric, while both surfaces of S3 are aspheric.

The disclosed lens designs provide lenses for projection television systems which are compact in overall dimension having a wide field angle and thus permits the overall cabinet for the projection television set to be reduced in volume.

It may thus be seen that the objects of the invention set forth, as well as those made apparent from the foregoing description, are efficiently attained. While preferred embodiments of the invention have been set forth for purposes of disclosure, modification to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A projection lens for a cathode ray tube display consisting of three lens units, the first lens unit from the image end consisting of an element of weak optical power serving to provide correction for aperture dependent aberrations; a second lens unit providing essentially all of the positive power of the overall lens; the third lens unit consisting of a negative element having a concave image side surface and providing correction for field curvature; said second lens unit comprising of two airspaced elements and being overall biconvex, at least one of the surfaces of the elements of said second lens unit having an aspheric surface, and said facing surfaces of said elements of said second lens unit being defined on radii at the optical axis of said lens elements, which are at least twice as great as the equivalent focal length of said lens.

2. The lens of claim 1, where the first element of said second lens unit has an optical power $K_2$, the second element of said second lens unit has an optical power $K_3$, and $$2.0 > K_2/K_3 > 1.0.$$

3. The lens of claim 1, where both of the facing surfaces of said second lens unit are aspheric.

4. The lens of claim 1, where $$1.3 > K_{G2}/K_0 > 1.0$$

$$1.3 > |K_{G3}/K_0| > 1.0$$

where $K_{G2}$ and $K_{G3}$ are the optical powers of said second and third lens units, respectively, and $K_0$ is the optical power of the overall lens.

5. The lens of claim 1, where said third lens unit is optically coupled to the screen of a cathode ray tube.

6. The lens of claim 1 here said first lens unit is of negative optical power.

7. The lens of claim 1 where said first lens unit is of positive optical power.

8. The lens of claim 1 where at least one of the facing surfaces of the elements of said second lens unit has an aspheric surface.

9. The lens of claim 1 where both of the facing surfaces of the elements of said second lens unit are aspheric.

10. The lens of claim 1 wherein said lens elements may have aspheric surfaces defined by $$X = \frac{Cy^2}{1 + \sqrt{1 - (1 + K)C^2y^2}} + Dy^4 + Ey^6 + Fy^8 + Gy^{10}$$

where X is the surface sag at a semi-aperture distance Y from the axis A of the lens; C is the curvature of the lens surface at the optical axis A, equal to the reciprocal of the radius at the optical axis; and K is a conic constant or other surface of revolution.

11. A lens according to claim 10, as scaled to an object diagonal of approximately five inches, defined substantially as follows:

| LENS | SURFACE RADIUS (mm) | AXIAL DISTANCE BETWEEN SURFACES (mm) | $N_d$ | $V_d$ |
|---|---|---|---|---|
| L1 | S1 115.050 | | | |
| | | 8.949 | 1.491 | 57.2 |
| | S2 183.743 | | | |
| | | 31.946 | | |
| L2 | S3 45.820 | | | |
| | | 21.028 | 1.491 | 57.2 |
| | S4 −525.725 | | | |
| | | 13.865 | | |
| L3 | S5 441.896 | | | |
| | | 10.922 | 1.491 | 57.2 |
| | S6 −81.690 | | | |
| | | 22.318 | | |
| L4 | S7 −30.780 | | | |
| | | 2.000 | 1.491 | 57.2 |
| | S8 Plano | | | |

| Aspheric Surfaces: S1, S4, S5, S8 | | | |
|---|---|---|---|
| | S1 | S4 | S5 | S7 |
| D | $-0.614 \times 10^{-06}$ | $0.100 \times 10^{-05}$ | $-0.275 \times 10^{-06}$ | $-0.257 \times 10^{-05}$ |
| E | $0.154 \times 10^{-09}$ | $0.929 \times 10^{-09}$ | $-0.146 \times 10^{-09}$ | $0.785 \times 10^{-08}$ |
| F | $-0.118 \times 10^{-12}$ | $-0.553 \times 10^{-12}$ | $-0.814 \times 10^{-13}$ | $-0.149 \times 10^{-10}$ |
| G | $0.264 \times 10^{-16}$ | $0.255 \times 10^{-15}$ | $0.655 \times 10^{-16}$ | $0.112 \times 10^{-13}$ |
| K | — | 0.010 | 0.010 | 0.010 |

EFL = 73.24 mm
Relative Aperture = 1/1.12 where $N_d$ is the index of refraction of the lens elements, $V_d$ is the dispersion of the lens measured by its Abbe number, S1-S8 are successive lens surfaces, the surfaces where positive are on radii struck from the right and where negative are on radii struck from the left, and surfaces S1, S4, St, and S8 are aspheric as shown.

12. A lens according to claim 10, as scaled to an object diagonal of approximately five inches, defined substantially as follows:

| LENS | SURFACE RADII (mm) | AXIAL DISTANCE BETWEEN SURFACES (mm) | $N_d$ | $V_d$ |
|---|---|---|---|---|
| | S1 698.318 | | | |

-continued

| LENS | | SURFACE RADII | AXIAL DISTANCE BETWEEN SURFACES | $N_d$ | $V_d$ |
|---|---|---|---|---|---|
| L1 | S1 | | 5.978 | 1.491 | 57.2 |
| | S2 | 823.548 | | | |
| | | | 34.213 | | |
| | S3 | 51.553 | | | |
| L2 | | | 25.758 | 1.491 | 57.2 |
| | S4 | −512.740 | | | |
| | | | 13.040 | | |
| | S5 | 311.806 | | | |
| L3 | | | 13.610 | 1.491 | 57.2 |
| | S6 | −98.754 | | | |
| | | | 33.576 | | |
| | S7 | −31.518 | | | |
| L4 | | | 2.000 | 1.491 | 57.2 |
| | S8 | Plano | | | |

Aspheric Surfaces: S1, S4, S5, S6, S7

| | S1 | S4 | S5 | S6 | S7 |
|---|---|---|---|---|---|
| D | $-0.576 \times 10^{-06}$ | $0.116 \times 10^{-05}$ | $0.709 \times 10^{-07}$ | — | $-0.479 \times 10^{-05}$ |
| E | $0.194 \times 10^{-09}$ | $0.457 \times 10^{-09}$ | $0.154 \times 10^{-09}$ | — | $0.102 \times 10^{-09}$ |
| F | $-0.960 \times 10^{-13}$ | $-0.112 \times 10^{-12}$ | $-0.414 \times 10^{-12}$ | — | $-0.737 \times 10^{-12}$ |
| G | $0.178 \times 10^{-16}$ | $0.132 \times 10^{-16}$ | $0.903 \times 10^{-16}$ | — | $-0.517 \times 10^{-15}$ |
| K | 0.010 | 0.010 | 0.010 | −1.000 | −1.000 |

EFL = 77.83 mm
Relative Aperture = 1/1.13 where $N_d$ is the index of refraction of the lens elements, $V_d$ is the dispersion of the lens measured by its Abbe number, S1-S8 are successive lens surfaces, the surfaces where positive are on radii struck from the right and where negative are on radii struck from the left, and surfaces S1, S4, S5, S6, and S7 are aspheric as shown.

13. A lens according to claim 10, as scaled to an object diagonal of approximately five inches, defined substantially as follows:

| LENS | | SURFACE RADII (mm) | AXIAL DISTANCE BETWEEN SURFACES (mm) | $N_d$ | $V_d$ |
|---|---|---|---|---|---|
| L1 | S1 | 117.348 | | | |
| | | | 8.949 | 1.491 | 57.2 |
| | S2 | 222.782 | | | |
| | | | 41.170 | | |
| | S3 | 39.868 | | | |
| L2 | | | 18.411 | 1.491 | 57.2 |
| | S4 | −6694.091 | | | |
| | | | 15.673 | | |
| | S5 | 260.930 | | | |
| L3 | | | 6.679 | 1.658 | 50.9 |
| | S6 | −106.871 | | | |
| | | | 18.466 | | |
| | S7 | −27.668 | | | |
| L4 | | | 2.000 | 1.491 | 57.2 |
| | S8 | Plano | | | |

Aspheric Surfaces: S1, S4, S7

| | S1 | S4 | S7 |
|---|---|---|---|
| D | $-0.669 \times 10^{-06}$ | $0.149 \times 10^{-05}$ | $-0.644 \times 10^{-05}$ |
| E | $0.224 \times 10^{-09}$ | $0.145 \times 10^{-08}$ | $0.279 \times 10^{-07}$ |
| F | $-0.122 \times 10^{-12}$ | $-0.103 \times 10^{-11}$ | $-0.591 \times 10^{-10}$ |
| G | $0.221 \times 10^{-16}$ | $0.635 \times 10^{-15}$ | $0.509 \times 10^{-13}$ |
| K | 0.010 | 0.010 | 0.010 |

EFL = 67.85 mm
Relative Aperture = 1/1.12 where $N_d$ is the index of refraction of the lens elements, $V_d$ is the dispersion of the lens measured by its Abbe number, S1-S8 are successive lens surfaces, the surfaces where positive are on radii struck from the right and where negative are on radii struck from the left, and surfaces S1, S4, and S7 are aspheric as shown.

14. A lens according to claim 10, as scaled to an object diagonal of approximately five inches, defined substantially as follows:

| LENS | | SURFACE RADII (mm) | AXIAL DISTANCE BETWEEN SURFACES (mm) | $N_d$ | $V_d$ |
|---|---|---|---|---|---|
| L1 | S1 | 95.282 | | | |
| | | | 11.210 | 1.491 | 57.2 |
| | S2 | 149.554 | | | |
| | | | 46.218 | | |
| | S3 | 53.438 | | | |
| L2 | | | 24.381 | 1.491 | 57.2 |
| | S4 | 559.853 | | | |
| | | | 19.172 | | |
| | S5 | 339.239 | | | |
| L3 | | | 9.087 | 1.658 | 50.9 |
| | S6 | −124.636 | | | |
| | | | 29.819 | | |
| | S7 | −38.499 | | | |
| L4 | | | 2.000 | 1.491 | 57.2 |
| | S8 | Plano | | | |

Aspheric Surfaces: S1, S4, S7

| | S1 | S4 | S7 |
|---|---|---|---|
| D | $-0.190 \times 10^{-06}$ | $0.986 \times 10^{-06}$ | $-0.219 \times 10^{-05}$ |
| E | $0.197 \times 10^{-10}$ | $0.414 \times 10^{-09}$ | $0.554 \times 10^{-08}$ |
| F | $-0.232 \times 10^{-13}$ | $-0.206 \times 10^{-12}$ | $-0.563 \times 10^{-11}$ |
| G | $0.381 \times 10^{-17}$ | $0.929 \times 10^{-16}$ | $0.221 \times 10^{-14}$ |
| K | 0.010 | 0.010 | 0.010 |

EFL = 84.99 mm
Relative Aperture = 1/1.10 where $N_d$ is the index of refraction of the lens elements, $V_d$ is the dispersion of the lens measured by its Abbe number, S1-S8 are successive lens surfaces, the surfaces where positive are on radii struck from the right and where negative are on radii struck from the left, and surfaces S1, S4, and S7 are aspheric as shown.

15. A lens according to claim 10, as scaled to an object diagonal of approximately five inches, defined substantially as follows:

| LENS | | SURFACE RADII (mm) | AXIAL DISTANCE BETWEEN SURFACES (mm) | $N_d$ | $V_d$ |
|---|---|---|---|---|---|
| L1 | S1 | 129.775 | | | |
| | | | 8.949 | 1.491 | 57.2 |
| | S2 | 250.970 | | | |
| | | | 31.809 | | |
| | S3 | 53.002 | | | |
| L2 | | | 20.260 | 1.491 | 57.2 |
| | S4 | −230.155 | | | |
| | | | 16.007 | | |
| | S5 | 2920.596 | | | |
| L3 | | | 9.771 | 1.491 | 57.2 |
| | S6 | −80.811 | | | |
| | | | 26.206 | | |
| | S7 | −33.389 | | | |
| L4 | | | 2.00 | 1.491 | 57.2 |
| | S8 | −600.000 | | | |

Aspheric Surfaces: S1, S4, S6, S7

| | S1 | S4 | S6 | S7 |
|---|---|---|---|---|
| D | $-0.655 \times 10^{-06}$ | $0.793 \times 10^{-06}$ | $0.388 \times 10^{-06}$ | $-0.160 \times 10^{-05}$ |
| E | $0.937 \times 10^{-10}$ | $0.406 \times 10^{-09}$ | $0.263 \times 10^{-09}$ | $-0.842 \times 10^{-09}$ |
| F | $-0.733 \times 10^{-13}$ | $-0.204 \times 10^{-12}$ | $-0.613 \times 10^{-12}$ | $0.271 \times 10^{-11}$ |
| G | $0.160 \times 10^{-16}$ | $0.984 \times 10^{-16}$ | $0.264 \times 10^{-15}$ | $-0.133 \times 10^{-14}$ |

-continued

| | | | | |
|---|---|---|---|---|
| K | 0.010 | 0.010 | .0.010 | 0.010 |

EFL = 73.25 mm
Relative Aperture = 1/1.12 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S1, S4, S6, and S7 are aspheric as shown.

16. A lens according to claim 10, as scaled to an object diagonal of approximately five inches, defined substantially as follows:

| LENS | SURFACE | RADIUS (mm) | AXIAL DISTANCE BETWEEN SURFACES (mm) | $N_d$ | $V_d$ |
|---|---|---|---|---|---|
| L1 | S1 | 864.113 | | | |
| | | | 6.243 | 1.491 | 57.2 |
| | S2 | 172.923 | | | |
| | | | 37.868 | | |
| | S3 | 56.297 | | | |
| L2 | | | 26.966 | 1.491 | 57.2 |
| | S4 | −400.05 | | | |
| | | | 11.382 | | |
| | S5 | 187.805 | | | |
| L3 | | | 16.248 | 1.491 | 57.2 |
| | S6 | −107.571 | | | |
| | | | 45.408 | | |
| | S7 | −42.673 | | | |
| L4 | | | 2.000 | 1.491 | 57.2 |
| | S8 | Plano | | | |

Aspheric Surfaces: S2, S3, S4, S6, S7

| | S2 | S3 | S4 |
|---|---|---|---|
| D | $0.480 \times 10^{-06}$ | $0.894 \times 10^{-07}$ | $0.314 \times 10^{-06}$ |
| E | $-0.163 \times 10^{-09}$ | $0.705 \times 10^{-11}$ | $0.871 \times 10^{-10}$ |
| F | $0.139 \times 10^{-12}$ | $0.857 \times 10^{-14}$ | $-0.136 \times 10^{-12}$ |
| G | $-0.207 \times 10^{-16}$ | $-0.318 \times 10^{-16}$ | $0.113 \times 10^{-16}$ |
| K | 0.010 | −1.000 | 0.01 |

| | S6 | S7 |
|---|---|---|
| D | $0.159 \times 10^{-06}$ | $-0.687 \times 10^{-05}$ |
| E | $0.277 \times 10^{-09}$ | $0.395 \times 10^{-08}$ |
| F | $-0.711 \times 10^{-13}$ | $-0.406 \times 10^{-11}$ |
| G | $-0.990 \times 10^{-17}$ | $0.638 \times 10^{-15}$ |
| K | | −1.000 |

EFL = 77.744
Aperture = 1/1.13 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S1, S4, S6, and S7 are aspheric as shown.

17. A lens according to claim 10, as scaled to an object diagonal of approximately five inches, defined substantially as follows:

| LENS | SURFACE | RADII (mm) | AXIAL DISTANCE BETWEEN SURFACES (mm) | $N_d$ | $V_d$ |
|---|---|---|---|---|---|
| L1 | S1 | 185.971 | | | |
| | | | 8.949 | 1.491 | 57.2 |
| | S2 | 115.960 | | | |
| | | | 28.666 | | |
| | S3 | 53.594 | | | |
| L2 | | | 21.610 | 1.491 | 57.2 |
| | S4 | −198.472 | | | |
| | | | 18.107 | | |
| | S5 | 180.049 | | | |
| L3 | | | 14.058 | 1.491 | 57.2 |
| | S6 | −89.499 | | | |
| | | | 30.417 | | |
| | S7 | −38.732 | | | |
| L4 | | | 2.000 | 1.491 | 57.2 |
| | S8 | Plano | | | |

Aspheric Surfaces: S2, S3, S5, S7

| | S2 | S3 | S5 | S7 |
|---|---|---|---|---|
| D | $0.486 \times 10^{-16}$ | $-0.130 \times 10^{-06}$ | $-0.321 \times 10^{-07}$ | $-0.564 \times 10^{-05}$ |
| E | $-0.481 \times 10^{-11}$ | $-0.155 \times 10^{-09}$ | $-0.268 \times 10^{-09}$ | $0.245 \times 10^{-08}$ |
| F | $0.765 \times 10^{-13}$ | $-0.363 \times 10^{-13}$ | $0.407 \times 10^{-12}$ | $-0.370 \times 10^{-11}$ |
| G | $-0.809 \times 10^{-18}$ | $-0.113 \times 10^{-16}$ | $-0.123 \times 10^{-15}$ | $0.455 \times 10^{-15}$ |
| K | −1.000 | 0.010 | 0.010 | |

EFL = 72.881
Relative Aperture = 1/1.12 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S1, S4, S6, and S7 are aspheric as shown.

18. A lens according to claim 10, as scaled to an object diagonal of approximately five inches, defined substantially as follows:

| LENS | SURFACE RADII (mm) | | AXIAL DISTANCE BETWEEN SURFACES (mm) | $N_d$ | $V_d$ |
|---|---|---|---|---|---|
| L1 | S1 | −1125.147 | | | |
| | | | 6.243 | 1.491 | 57.2 |
| | S2 | 241.451 | | | |
| | | | 28.374 | | |
| | S3 | 57.144 | | | |
| L2 | | | 22.655 | 1.491 | 57.2 |
| | S4 | −738.941 | | | |
| | | | 14.932 | | |
| | S5 | 358.660 | | | |
| L3 | | | 18.726 | 1.613 | 58.6 |
| | S6 | −90.673 | | | |
| | | | 46.540 | | |
| | S7 | −42.831 | | | |
| L4 | | | 2.000 | 1.491 | 57.2 |
| | S8 | Plano | | | |

Aspheric Surfaces: S2, S3, S4, S7

| | S2 | S3 | S4 | S7 |
|---|---|---|---|---|
| D | $0.361 \times 10^{-01}$ | $0.260 \times 10^{-06}$ | $0.894 \times 10^{-06}$ | $-0.708 \times 10^{-05}$ |
| E | $-0.996 \times 10^{-10}$ | $0.462 \times 10^{-10}$ | $0.332 \times 10^{-09}$ | $0.552 \times 10^{-08}$ |
| F | $0.612 \times 10^{-10}$ | $0.128 \times 10^{-12}$ | $0.458 \times 10^{-13}$ | $-0.552 \times 10^{-11}$ |
| G | $-0.598 \times 10^{-17}$ | $-0.685 \times 10^{-16}$ | $-0.542 \times 10^{-16}$ | $0.136 \times 10^{-14}$ |
| K | 0.010 | −1.000 | 0.010 | −1.000 |

EFL = 77.905
Relative Aperture = 1/1.13 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S1, S4, S6 and S7 are aspheric as shown.

19. A projection lens for a cathode ray tube display consisting of three lens units, the first lens unit from the image end consisting of an element of weak optical power providing correction for aperture dependent aberrations and having at least one aspheric surface; the second lens unit providing essentially all of the positive power of the overall lens; the third lens unit consisting of a negative element having a concave image side surface providing correction for field curvature; said second lens unit consisting of two airspaced elements and being overall biconvex at least one of the surfaces of the elements of said second group having an aspheric surface, said facing surfaces of said second lens unit being defined on radii at the optical axis of said lens elements which are at least twice as great as the equivalent focal length of said lens.

20. The lens of claim 19, where the first element of said second lens unit has an optical power $K_2$, the second element of said second lens unit has an optical power $K_3$, and $$2.0 > K_2/K_3 > 1.0.$$

21. The lens of claim 19, where both of the facing surfaces of said second lens unit are aspheric.

22. The lens of claim 19, where $$1.3 > K_{G2}/K_0 > 1.0$$

$$1.3 > |K_{G3}/K_0| > 1.0$$

where $K_{G2}$ and $K_{G3}$ are the optical powers of said second and third lens units, respectively, and $K_0$ is the optical power of the overall lens.

23. The lens of claim 19, where said third lens unit is optically coupled to the screen of a cathode ray tube.

24. The lens of claim 19, where the element of said first lens unit is of negative optical power.

25. The lens of claim 19, where the element of said first lens unit is of positive optical power.

26. A projection lens of the type consisting of three lens units from the image end, the first lens unit consisting of an element having an aspheric surface and serving to provide correction for aperture dependent aberrations, a second lens unit of strong optical power providing substantially all of the positive optical power of said lens, and a third lens unit consisting of a negative element having a concave image side aspheric surface and providing correction for field curvature; said second lens unit consisting of two airspaced elements being overall biconvex and having at least one aspheric surface, the facing surfaces of the elements of said second lens unit being defined on radii at the optical axis of said lens which are at least twice as great as the equivalent focal length of said lens, said first and second lens units being axially spaced a distance which is a substantial percentage of the equivalent focal length of said lens.

27. The lens of claim 26, where the first element of said second lens unit has an optical power $K_2$, the second element of said second lens unit has an optical power $K_3$, and $$2.0 > K_2/K_3 > 1.0.$$

28. The lens of claim 26, where both of the facing surfaces of said second lens unit are aspheric.

29. The lens of claim 26, where $$1.3 > K_{G2}/K_0 > 1.0$$

$$1.3 > |K_{G3}/K_0| > 1.0$$

where $K_{G2}$ and $K_{G3}$ are the optical powers of said second and third lens units, respectively, and $K_0$ is the optical power of the overall lens.

30. The lens of claim 26, where said third lens unit is optically coupled to the screen of a cathode ray tube.

31. The lens of claim 26, where at least one of the facing surfaces of the elements of said second lens unit are aspheric.

32. The lens of claim 26, where the element of said first lens unit is of negative optical power.

33. The lens of claim 26, where the element of said first lens unit is of positive optical power.

34. The lens of claim 26 where $$1.3 > K_{G2}/K_0 > 1.0$$

$$1.3 > |K_{G3}/K_0| > 1.0$$

where $K_{G2}$ is the optical power of said second lens unit, $K_{G3}$ is the optical power of said third lens unit, and $K_0$ is the optical power of the overall lens.

35. The lens of claim 26, where the first element of said second lens unit has an optical power $K_2$, the second element of said second lens unit has an optical power $K_3$, and $$2.0 > K_2/K_3 > 1.0.$$

36. The lens of claim 26, where both of the facing surfaces of said second lens unit are aspheric.

37. A projection lens of the type consisting of three lens units, from the image end, the first lens unit consisting of an element of weak optical power and having an aspheric surface, a second lens unit of positive optical power and a third lens unit consisting of a negative element having a concave image side aspheric surface and providing correction for field curvature; said second lens unit consisting of two airspaced elements being overall biconvex and having at least one aspheric surface, the facing surfaces of the elements of said second lens unit being defined on radii at the optical axis of said lens elements which are at least twice as great as the equivalent focal length of said lens, said first and second lens units being widely axially airspaced.

38. The lens of claim 37, where the first element of said second lens unit has an optical power $K_2$, the second element of said second lens unit has an optical power $K_3$, and $$2.0 > K_2/K_3 > 1.0.$$

39. The lens of claim 37, where both of the facing surfaces of said second lens unit are aspheric.

40. The lens of claim 37, where $$1.3 > K_{G2}/K_0 > 1.0$$

$$1.3 > |K_{G3}/K_0| > 1.0$$

where $K_{G2}$ and $K_{G3}$ are the optical powers of said second and third lens units, respectively, and $K_0$ is the optical power of the overall lens.

41. The lens of claim 37, where said third lens unit is optically coupled to the screen of a cathode ray tube.

42. The lens of claim 37, where at least one of the facing surfaces of the elements of said second lens unit is aspheric.

43. The lens of claim 37 where $$1.3 > K_{G2}/K_0 > 1.0$$

where $K_{G2}$ is the optical power of said second lens unit, and $K_0$ is the optical power of the overall lens.

* * * * *

UNITED STATES PATENT AND TRADEMARK OFFICE
CERTIFICATE OF CORRECTION

PATENT NO. : 4,707,084
DATED : Nov. 17, 1987
INVENTOR(S) : ELLIS I. BETENSKY

It is certified that error appears in the above-identified patent and that said Letters Patent are hereby corrected as shown below:

COVER PAGE:

Following the listed foreign patent documents, insert:

--OTHER PUBLICATIONS
Printed Publication-Diagram of a Lens entitled, Advent Lens Mod II.
Printed Publication-pp. 470-482 of a Volume entitled, A System of Optical Design, by Cox.--

IN THE CLAIMS:

Column 9, line 39 (Claim 1): change "comprising" to --consisting--.

Column 9, line 67 (Claim 6): change "here" to --where--.

Signed and Sealed this

Twenty-sixth Day of April, 1988

Attest:

DONALD J. QUIGG

*Attesting Officer*     *Commissioner of Patents and Trademarks*